(12) United States Patent
Gearhart

(10) Patent No.: US 6,739,964 B2
(45) Date of Patent: May 25, 2004

(54) DEER HOIST

(76) Inventor: Terry Gearhart, 174 Mount Hope Rd., Mcveytown, PA (US) 17051

( * ) Notice: Subject to any disclaimer, the term of this patent is extended or adjusted under 35 U.S.C. 154(b) by 0 days.

(21) Appl. No.: 10/400,476

(22) Filed: Mar. 28, 2003

(65) Prior Publication Data

US 2003/0228838 A1 Dec. 11, 2003

Related U.S. Application Data

(60) Provisional application No. 60/386,387, filed on Jun. 7, 2002.

(51) Int. Cl.$^7$ .................................................. A22B 1/00
(52) U.S. Cl. ........................................ 452/187; 452/189
(58) Field of Search ................... 452/185, 187–192; 212/180; 414/462

(56) References Cited

U.S. PATENT DOCUMENTS

| | | | |
|---|---|---|---|
| 322,181 A | * | 7/1885 | Hursh ........................ 414/267 |
| 3,854,168 A | * | 12/1974 | Bradley ...................... 452/189 |
| 3,894,313 A | | 7/1975 | Miller |
| 4,806,063 A | | 2/1989 | York |
| 4,860,404 A | | 8/1989 | Flachs |
| 4,903,372 A | | 2/1990 | Jones |
| 4,997,152 A | * | 3/1991 | Wagman et al. ............ 248/168 |
| 5,049,110 A | | 9/1991 | Owens |
| 5,211,601 A | * | 5/1993 | Cope .......................... 452/187 |
| 5,263,675 A | * | 11/1993 | Roberts et al. ........... 248/219.4 |
| 5,288,265 A | | 2/1994 | Beason et al. |
| 5,395,284 A | | 3/1995 | Frisk |
| 5,417,609 A | | 5/1995 | Oldham |
| 5,562,534 A | | 10/1996 | McGough |
| 5,588,907 A | * | 12/1996 | DePietro et al. ............ 452/187 |
| 5,607,143 A | * | 3/1997 | Regal ......................... 254/342 |
| 5,791,858 A | * | 8/1998 | Sasser ........................ 141/462 |
| 5,820,455 A | | 10/1998 | Breedlove |
| 5,873,776 A | | 2/1999 | Klepac |
| 5,938,521 A | | 8/1999 | Jasek et al. |
| 6,045,442 A | | 4/2000 | Bounds |
| 6,062,974 A | | 5/2000 | Williams |
| 6,202,868 B1 | * | 3/2001 | Murray ...................... 212/294 |
| 6,250,483 B1 | * | 6/2001 | Frommer .................... 212/180 |
| 6,264,544 B1 | | 7/2001 | Mullins |

FOREIGN PATENT DOCUMENTS

CA 2251413 * 7/1999

* cited by examiner

*Primary Examiner*—Peter M. Poon
*Assistant Examiner*—David Parsley
(74) *Attorney, Agent, or Firm*—Richard C. Litman

(57) ABSTRACT

A portable V-shaped tree- or pole-mounted deer hoist is made up of a boom having a front bracket, a rear retaining bar and a separate bracket-mounted winch. The winch bracket is strapped onto the tree or pole at a location on the tree or pole below the hoist bracket. A rope connected at one end to the winch is connected at the other end to a gambrel and is used to raise or lower an animal carcass using a pulley that is attached to the front tip of the V-shaped front boom bracket. The deer hoist, winch bracket and gambrel can be easily assembled for portability.

3 Claims, 6 Drawing Sheets

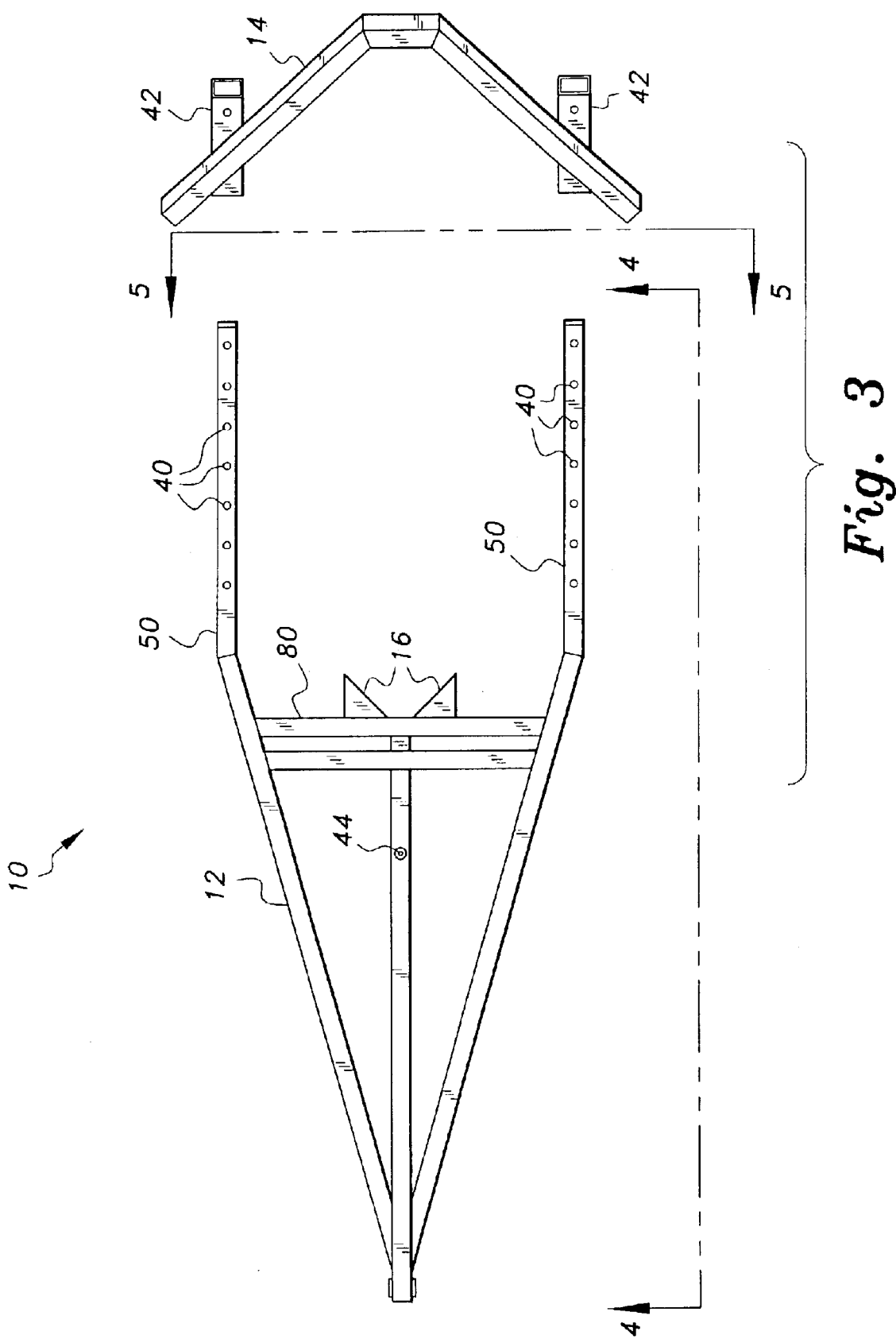

DEER HOIST

CROSS-REFERENCE TO RELATED APPLICATION

This application claims the benefit of U.S. Provisional Patent Application Serial No. 60/386,387, filed Jun. 7, 2002.

BACKGROUND OF THE INVENTION

1. Field of the Invention

The present invention relates to portable deer hoists. In particular, the invention is directed to a deer hoist that can be mounted onto any available large tree or onto a pole for dressing a deer or other game animal on the spot.

2. Description of Related Art

Hunters find their prey in forests or wooded game preserves. It is generally desirable to dress game, such as deer, as soon as possible. In dressing game it is preferable to raise the carcass off of the ground. Although vehicle mounted deer hoists are known, vehicle mounted hoists usually require an open bed truck, and require that the carcass be transported to the vehicle, sometimes over a considerable distance. Free standing deer hoists typically have heavy base structures for stability, diminishing the advantage of portability. A deer hoist which is portable and can be quickly and easily mounted to any available tree or pole support would therefore be desirable. Several inventions have been proposed to address these problems.

U.S. Pat. No. 3,894,313, issued to Miller on Jul. 15, 1975, and U.S. Pat. No. 4,860,404, issued to Flachs on Aug. 29, 1989, teach a portable collapsible frame hoist for raising a slaughtered animal sufficiently above ground to prevent dogs and other animals from reaching the carcass.

U.S. Pat. No. 4,806,063, issued to York on Feb. 21, 1989, and U.S. Pat. No. 4,903,372, issued to Jones on Feb. 27, 1990, teach a vehicle-mounted animal hoist.

U.S. Pat. No. 5,049,110, issued to Owens on Sep. 17, 1991 teaches a portable game hoist in which a V-shaped structure is fastened to a tree and a pulley is used with a rope to raise the animal. However, the structure shown lacks the strengthening and stabilizing features of the present invention, e.g., the tree- or pole-supported winch in addition to a wider, more stable V-shaped blade.

U.S. Pat. No. 5,288,265, issued to Beason et al. on Feb. 22, 1994, teaches a hinged gambrel.

U.S. Pat. No. 5,395,284, issued to Frish on Mar. 7, 1995, and U.S. Pat. No. 5,417,609, issued to Oldham on May 23, 1995, teach telescopic game hoists mounted on a horizontal tree limb or other overhanging structure.

U.S. Pat. No. 5,562,534, issued to McGough on Oct. 8, 1996, teaches a game hoist and skinning tool that straps onto a tree at three different positions and includes a tree-mounted winch.

U.S. Pat. No. 5,820,455, issued to Breedlove on Oct. 13, 1998, teaches a portable game hoist including a tree-penetrating blade, a chain for strapping the hoist to a tree, and a set of pulleys for raising the game carcass.

U.S. Pat. No. 5,873,776, issued to Klepac on Feb. 23, 1999, teaches an expanding gambrel.

U.S. Pat. No. 5,938,521, issued to Jasek et al. on Aug. 17, 1999, teaches an adjustable gambrel.

U.S. Pat. No. 6,045,442, issued to Bounds on Apr. 4, 2000, teaches a heavy game hoist which is mounted onto a tree and includes a winch that is also tree-mounted.

U.S. Pat. No. 6,062,974, issued to Williams on May 16, 2000, teaches a portable tree-mounted game support.

U.S. Pat. No. 6,264,544, issued to Mullins on Jul. 24, 2001, teaches a game hanger used for weighing large animals.

None of the above inventions and patents, taken either singly or in combination, is seen to describe the instant invention as claimed.

SUMMARY OF THE INVENTION

The present invention is directed to a deer hoist. More particularly, the deer hoist is portable and tree- or pole-mounted, and includes a winch for raising the deer carcass. The hoist is attached tightly to the tree or pole using a V-shaped fastening bar. A blade located at the bottom of the hoist rests against, and partially penetrates the tree or pole thereby preventing vertical slippage. The front tip of the hoist includes a pulley and a gambrel which holds the rear legs of the carcass of the animal being raised and dressed. In addition, the hoist and winch can be easily assembled for portability by placing the parts in an appropriate relationship and using a fastener that securely holds them together.

Accordingly, it is a principal object of the invention to provide a portable tree- or pole-mounted deer hoist.

It is another object of the invention to provide a deer hoist as described above including horizontal, vertical and angled supporting braces.

It is a further object of the invention to provide a deer hoist as described above including a tree- or pole-mounted winch.

It is a further object of the invention to provide a deer hoist as described above that can be easily assembled for portability.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 3 is an exploded plan view of the boom structure showing the front bracket and rear retaining bar.

Similar reference characters denote corresponding features consistently throughout the attached drawings.

DETAILED DESCRIPTION OF THE PREFERRED EMBODIMENTS

The present invention is directed to a portable tree- or pole-mounted deer hoist.

Figure 1:
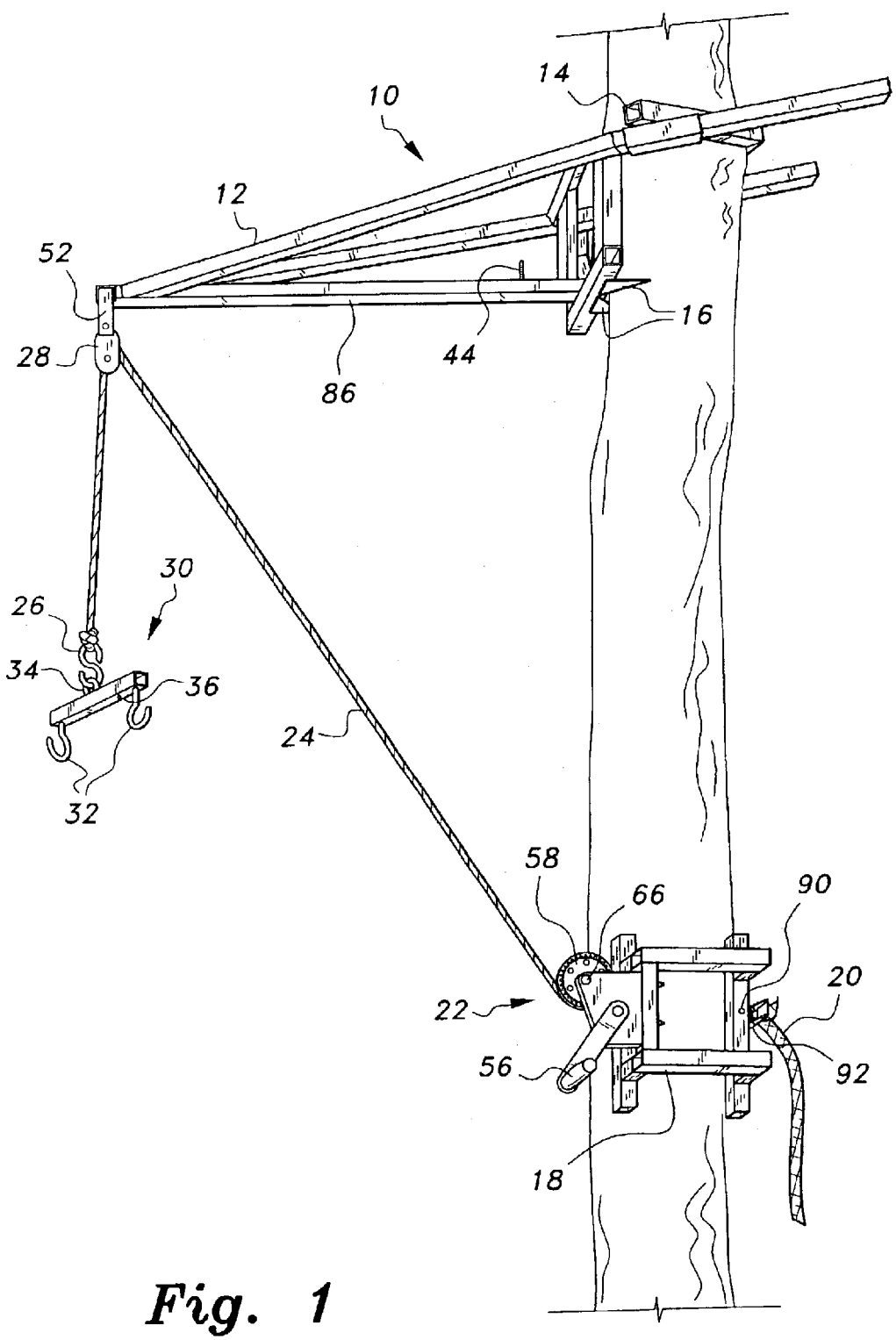
FIG. 1 is a side perspective view of a deer hoist and winch according to the present invention, mounted on a tree.
Figure 2:
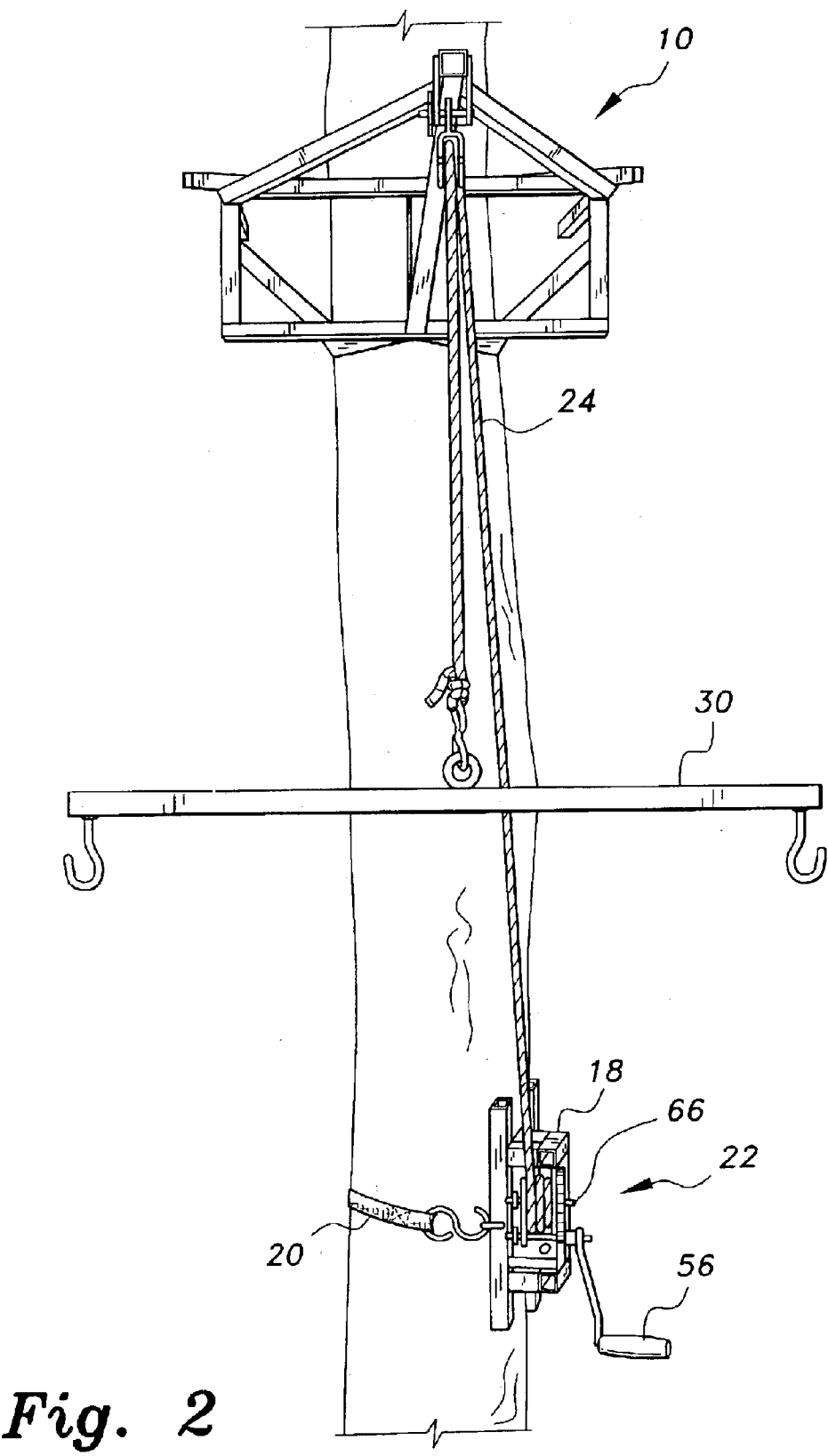
FIG. 2 is an elevational front view of the deer hoist and winch.

FIGS. 1 and 2 show the deer hoist structure 10 mounted on a tree. The boom portion of the deer hoist is made of two sections: the front V-shaped bracket 12 and the rear retaining bar 14. A V-shaped blade 16 at the lower portion of the bracket 12 which partially penetrates the bark of the tree prevents vertical movement of the hoist, thereby adding stability. A winch 22 is attached to a winch bracket 18 which, in turn, is mounted on the tree using a band strap 20. It is noted that the axis of rotation of the winch reel 58, which rotates with handle 56, causes the gambrel 30 to raise or lower depending upon the direction in which the handle is rotated. Moreover, the axis of the winch reel axle 66 on which the reel 58 rotates, is oriented perpendicular to the plane of the winch bracket 18, as well as perpendicular to the longitudinal direction of the tree.

Figure 7:
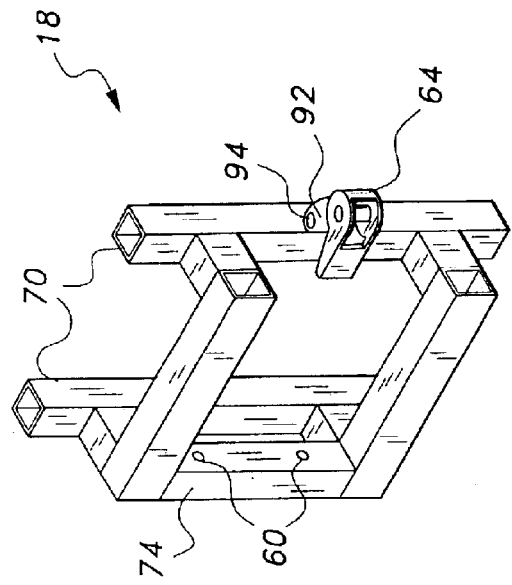
FIG. 7 is a perspective view of the winch bracket of FIG. 6 shown from the opposite end, showing the strap gripper.
Figure 6:
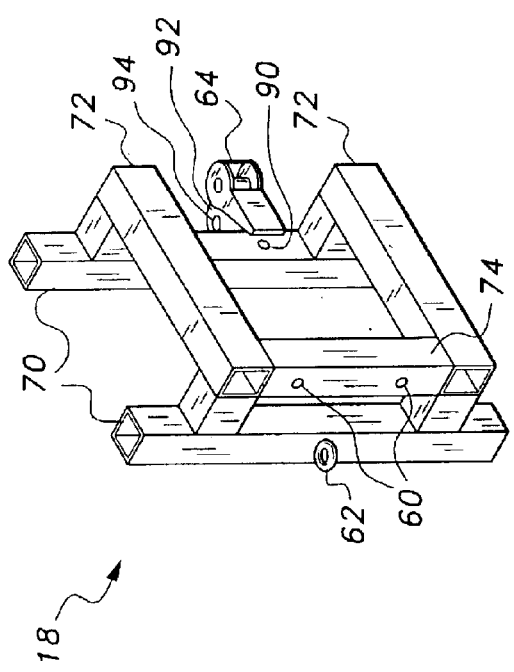
FIG. 6 is a perspective view of the winch bracket showing the winch attachment holes and a fastener hole, which is used in assembling the deer hoist for portability.

The band strap 20 includes a gripper/clamp 64, shown more particularly in FIGS. 6 and 7. A load-bearing rope 24 is connected at one end to the winch 22 and at the opposite end to a dual (S-shaped) hook 26, which holds the gambrel 30. The rear legs of the deer carcass are held on hooks 32. The rope passes through a pulley 28 suspended from and attached to a pair of pulley support brackets 52 at the tip of the bracket 12.

FIGS. 1 and 2 also show that the plane of the winch bracket 18 is oriented approximately parallel with the direction pointed to by the hoist bracket 12.

FIG. 3 shows a detailed plan view of the front bracket 12 and rear retaining bar 14. The front bracket 12 has a V-shaped tip at the front and two parallel side bars 50 extending to the rear. The side bars include several evenly spaced attachment holes 40 for attaching to the mounts 42 of the rear retaining bar 14 using appropriate attachment pins. The side bars 50 slide into the respective tubular attachment mounts 42. Lower cross-bar 80 located at the bottom of the front bracket 12 (see FIG. 4A) includes a wide V-shaped blade 16 which penetrates the bark of the tree during use.

Figure 4A:
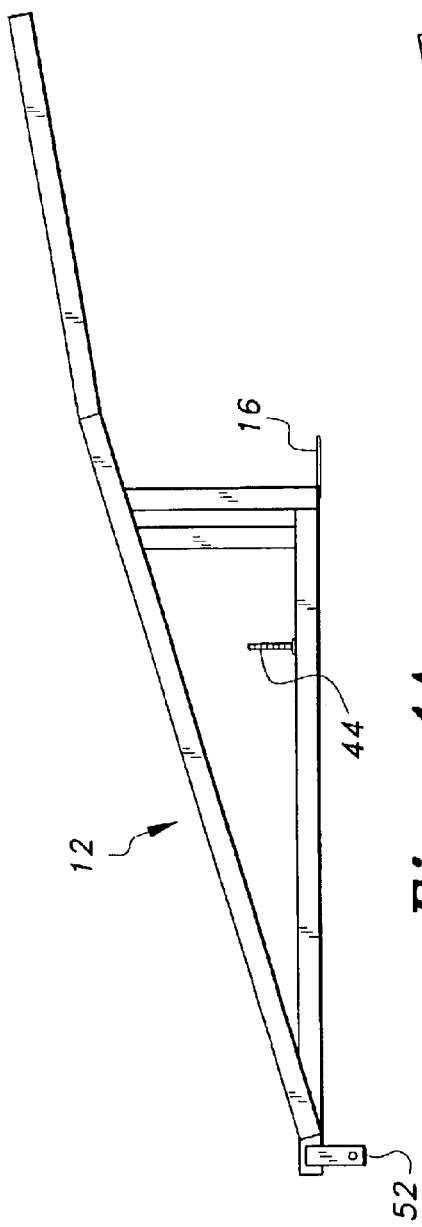
FIGS. 4A and 4B are side elevational views of the front bracket of the boom structure with alternative tips, i.e., a pulley support tip and a hook tip, respectively.
Figure 4B:
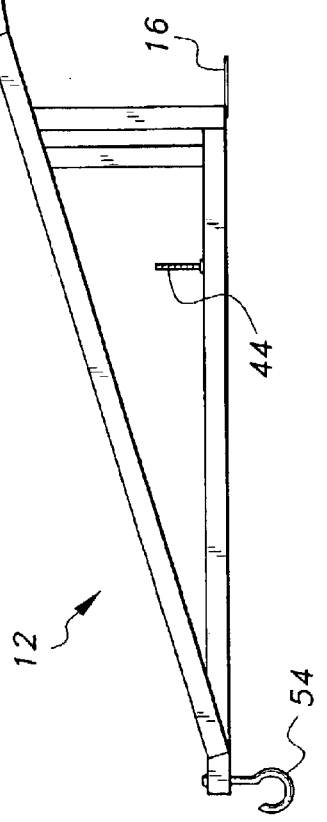

FIG. 4B shows an alternate tip for the boom, in this case a hook 54 rather than a support bracket (52, FIG. 4A) for a pulley.

Figure 5:
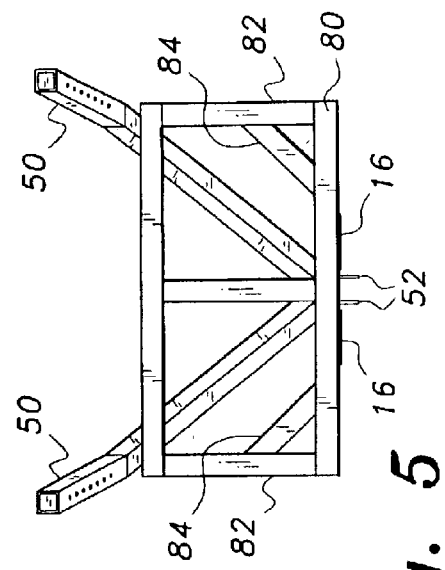
FIG. 5 is a rear view of the front bracket of the hoist.

FIGS. 4A and 5 show the position of the blade 16 at the lower edge of the front bracket 12. Angle braces 84 provide additional structural support between the lower cross bar 80 and the two vertical support bars 82.

The bars and braces that made up the hoist are preferably square tubular steel (as shown) or round tubular steel, but can be any other suitable structural material that has sufficient strength to support animal carcasses that may weigh hundreds of pounds. When tubular (square or round) steel is used, the pieces can be cut to size and welded to ensure strength.

FIGS. 6 and 7 show two perspective views of the winch support bracket 18. The bracket includes two vertical support bars 70 that rest against the tree or pole along a direction parallel with the axis of the tree or pole. Two horizontal bars 72 are attached to the vertical bars 70 through four smaller horizontal spacer segments as shown. Vertical brace 74 has holes 60 for attaching the winch 22. Again, these winch bracket bars and braces can be made of square or round steel tubes or any other suitable structural material having sufficient strength.

A band strap hook attachment ring 62 is located at one side of the winch bracket and a ratcheting strap gripper attachment 64 is at the opposite side. The gripper attachment 64 is held by a bracket 92 that is held onto a pivot 94 that is, in turn, fastened to the winch bracket.

The flexible band or strap 20 is wrapped around the tree or pole to hold the winch bracket in place for use. The strap 20 is preferably made from nylon webbing. As shown in FIGS. 1 and 2, a hook at the free end of the strap 20 is attached to the ring 62 and is tightened by ratcheting the gripper 64 located at the opposite end.

During use, the front bracket 12 of the boom structure is mounted on a tree at a height sufficient for the animal carcass to clear the ground after being hoisted, and the protruding side bars 50 are telescoped into the rear bracket 14 and secured by pins. The blade 16 penetrates into the bark of the tree or into the side of the pole to prevent downward slip of the hoist.

Next, the winch bracket 18 with the winch 22 attached, is mounted onto the tree or pole at a lower height than the hoist, essentially in a parallel orientation with the direction pointed to by the hoist bracket 12.

Figure 8:
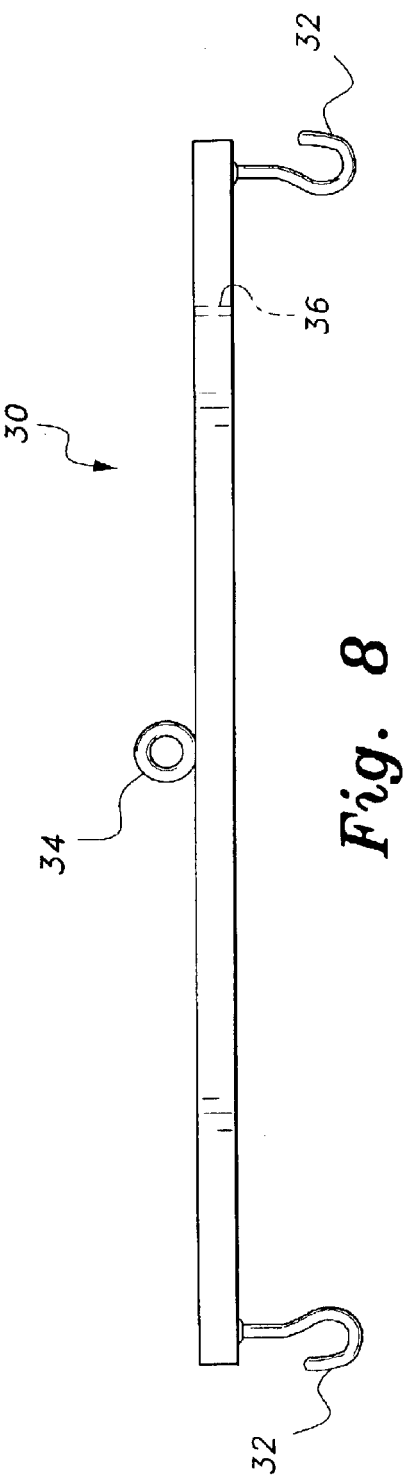
FIG. 8 is an elevational front view of the gambrel.

The free end of the winch rope 24 is fed from the winch reel through the pulley 28 (FIGS. 1, 2) and attached to the dual hook 26. Finally, the ring 34 of the gambrel 30 (shown in detail in FIG. 8) is attached to the dual hook 26 to complete the assembly.

The deer hoist includes features that enhance the portability of the deer hoist when not in use, i.e., which provide for quick, convenient, and compact assembly for storage and transport. These features include an assembly post or stud 44 located on lower horizontal support 86 of the bracket 12, seen most clearly in FIGS. 4A and 4B. The post 44 extends upward a sufficient length to be able to mount the gambrel 30 and the winch bracket 18. To assemble for storage or transport, the gambrel 30 is placed on the lower horizontal bar of the main hoist bracket 12, making sure the post 44 extends upward through the hole 36 located at one end of the gambrel 30.

Figure 9:
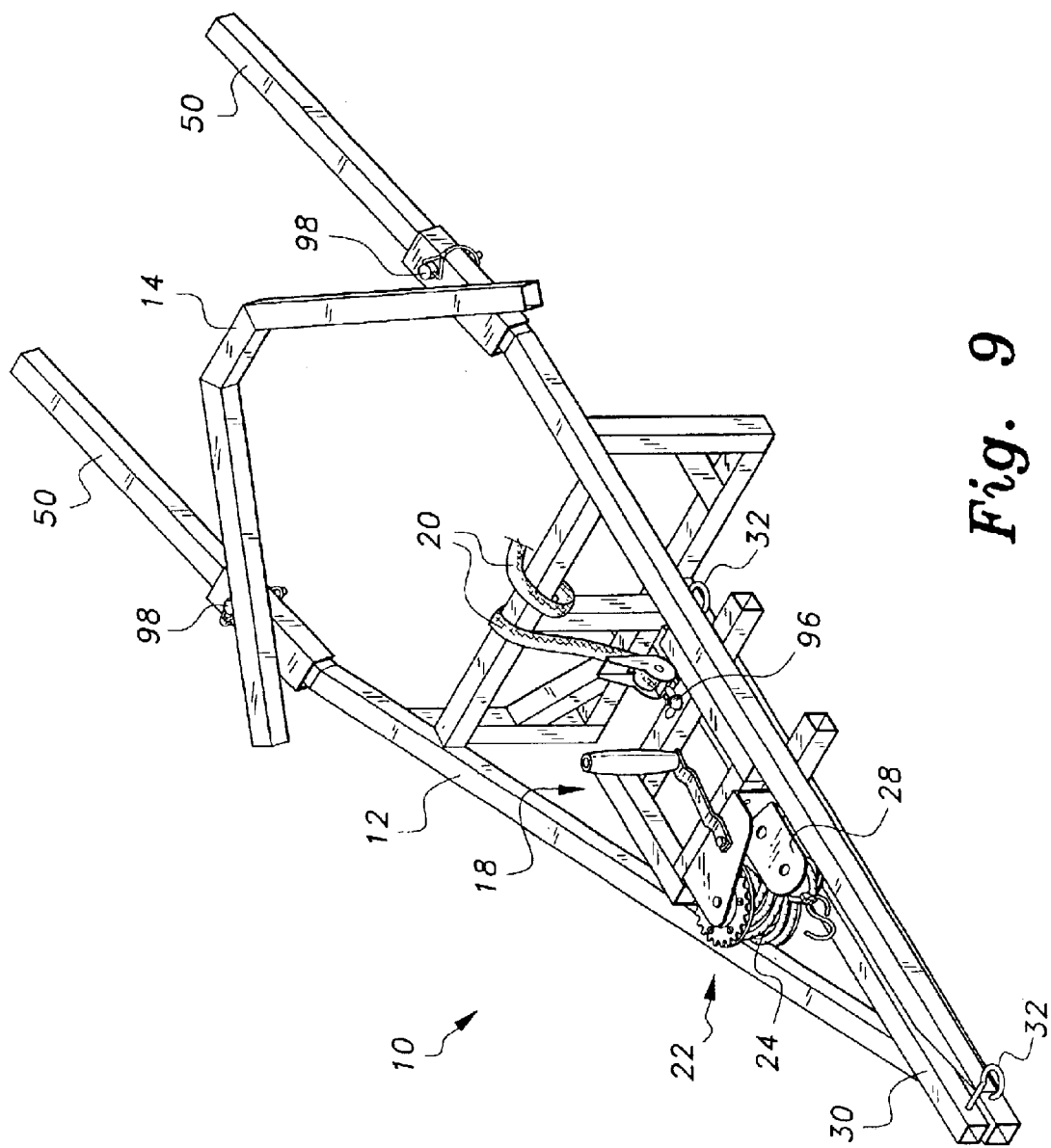
FIG. 9 is a perspective view of the deer hoist assembled for transport or storage.

Then the winch bracket 18 is placed on the gambrel 30 making sure the post extends through the hole 90 in the winch bracket 18. A wing nut 96 is then threaded onto the post 44 and tightened thereon to securely fasten the entire assembly for portability as shown in FIG. 9. Fasteners 98 hold the rear retaining bar 14 securely onto the rear side bars 50 of the main hoist bracket 12.

It is to be understood that the present invention is not limited to the sole embodiments described above, but encompasses any and all embodiments within the scope of the following claims.

I claim:

1. A deer hoist mountable against a vertical columnar structure, comprising:
   a boom having:
      a front V-shaped bracket having two upper horizontal side bars, each with a forward end and a back end, the back ends having a plurality of attachment holes spaced from the distal ends thereof, and a lower horizontal strut having a forward end and a back end, wherein the forward ends of the side bars and the lower strut meet at a tip of the boom, and wherein the lower strut is shorter than the two side bars, the bracket further having a pulley depending from the tip of the boom;
      a rear retaining bar having two tubular mounts, the distal ends of the two side bars telescoping into the respective mounts, whereby the columnar structure is adapted for being clamped between the bracket and the retaining bar;
   a winch reel having a winch rope attached thereto, the winch rope being looped over the pulley;
   a winch bracket, the winch reel being attached to the winch bracket, the winch bracket having:

first and second parallel vertical support bars, the winch reel being mounted for rotation in a plane parallel to a plane in which the vertical support bars are disposed;

two parallel horizontal bars attached to and spaced apart from the vertical support bars;

a band strap having a first end and a second end, the first end being fixed to the first vertical support bar; and a ratchet gripper fixed to the second vertical support bar; and a gambrel attached to the winch rope, the gambrel having opposed ends and a hook mounted on each of the opposed ends for receiving a deer;

whereby, the winch bracket is abutted to the vertical columnar structure with the vertical support bars parallel to the columnar structure and the second end of the band strap is wrapped around the columnar structure and ratcheted through the gripper in order to attach the winch assembly to the columnar structure.

2. The deer hoist according to claim 1, wherein the boom further comprises a V-shaped blade mounted at the back end of the lower horizontal strut, the blade being adapted for engaging the columnar structure in order to provide vertical stability of the boom.

3. The deer hoist according to claim 1, wherein:

the lower horizontal strut of the boom further includes an upwardly protruding threaded post;

the winch bracket and the gambrel each have fastener holes defined therein capable of receiving the post; and the hoist further includes a fastening nut threadedly attachable to the post;

whereby the winch bracket and the gambrel are disposed on the post and fastened thereto with the nut for storage and transport.

* * * * *